United States Patent [19]

Dambre

[11] Patent Number: 4,854,032

[45] Date of Patent: Aug. 8, 1989

[54] METHOD OF MANUFACTURING A STEEL WIRE WITH HIGH TENSILE STRENGTH

[75] Inventor: Paul Dambre, Kemmel, Belgium

[73] Assignee: N.V. Bekaert S.A., Zwevegem, Belgium

[21] Appl. No.: 168,443

[22] Filed: Mar. 15, 1988

Related U.S. Application Data

[62] Division of Ser. No. 884,678, Jul. 17, 1986, Pat. No. 4,737,392.

[30] Foreign Application Priority Data

Dec. 5, 1983 [GB] United Kingdom ................ 8332395

[51] Int. Cl.$^4$ ................................................ B21C 9/00
[52] U.S. Cl. ..................................... 29/527.4; 72/286; 72/378; 156/124
[58] Field of Search ................ 72/286, 378; 420/99, 420/8, 91; 428/36, 382, 383, 375, 380; 152/451; 156/124; 29/527.4

[56] References Cited

U.S. PATENT DOCUMENTS

| | | | |
|---|---|---|---|
| 3,952,571 | 4/1976 | Yokota et al. ........................ 72/286 |
| 4,280,857 | 7/1981 | Dameron, Jr. et al. .......... 72/286 X |
| 4,612,792 | 9/1986 | De Bondt et al. .................... 72/183 |

OTHER PUBLICATIONS

Nakamura et al., "The Influence of Phosphorous and Sulfur Contents on the Plastic Deformability of High Carbon Steel Wire", *Wire Journal*, Sep. 1978, pp. 110–113.

*Primary Examiner*—Joseph M. Gorski
*Attorney, Agent, or Firm*—Foley & Lardner, Schwartz Jeffery, Schwaab, Mack, Blumenthal & Evans

[57] ABSTRACT

A method of manufacturing a steel wire with high tensile strength having improved bending and torsional ductility properties useful as a reinforcement wire or cord, especially for rubber products such as tires, comprising providing steel comprising less than 0.015%, preferably less than 0.010%, and most preferably less than 0.008% by weight sulfur and drawing said steel beyond normal drawing limits into a wire having a tensile strength in N/mm$^2$ of at least 2250−1130 log d where d is the wire diameter in millimeters, and optionally, depositing a covering layer of rubber adherable material such as brass on the drawn wire.

32 Claims, No Drawings

METHOD OF MANUFACTURING A STEEL WIRE WITH HIGH TENSILE STRENGTH

This application is a division of copending U.S. patent application Ser. No. 884,678 filed July 17, 1986 now U.S. Pat. No. 4,737,392, which in turn is a continuation of therewith copending U.S. patent application Ser. No. 678,477 filed Dec. 5, 1984, now abandoned.

BACKGROUND OF THE INVENTION

The present invention relates to carbon steel wire for high tensile strength applications. The usual composition for this comprises alloying elements (herein defined as those elements that are present in an amount of at least 0.05%) among which the carbon is present in an amount ranging from 0.4% to 1.4%, manganese from 0.1 to 1% and silicon from 0.05% to 1%, the remainder being iron and impurities (herein defined as those elements that are in an amount of less than 0.05%), all percentages of this disclosure being percentages by weight.

By "wire" is meant here any elongated form, irrespective of the cross-sectional shape, the latter being circular in general, but the latter can also have another form, such as rectangular, with a widthto-thickness ratio ranging e.g. from 1 to 20, or any other form. In such cases, the diameter of the circle having the same cross-sectional area will be considered here as the "diameter" of the wire.

The high tensile strength will in general have been obtained by cold working a pearlitic steel microstructure, preferably by drawing, but this can also have been obtained, e.g. by cold rolling or a combination thereof with a preceding cold drawing operation.

It is known that steel of the composition above must not be cold drawn or worked into wire to such high tensile strength that this would result in insufficient ductility for supporting bending and torsional loads. In dependence on the diameter, there is a tensil strength limit above which special care must be taken. This limit is higher for thin final diameters than for thick ones. This limit in function of the diameter is given by the formula ($R_m$ being the tensile strength limit in N/mm² and d being the wire diameter in mm) :

$$R_m = 2250 - 1130 \log d \quad (1)$$

which, in a tensile strength-versus-diameter diagram, shows a line, the "line of special care", above which there is the field of high tensile strength.

It is to the wire in this field of high tensile strength that the invention applies. In this field the wires can rather easily pass the current tests on ductility for axial loads, but the problems become more difficult when bending and torsional ductility tests are involved. For the wires having a tensile strength $R_m$ above a given line, called here the "problem-line", given by the formula $$R_m = 2325 - 1130 \log d \quad (2)$$

the percentage of rejections in these bending and torsional tests become excessive. The difficulty is, that among wires that usually successfully passed the ductility test under axial load, there is a part that passes the bending and torsional ductility tests and another part that does not, and that the reasons of this different behavior are unknown.

This puts a severe limit to the tensile strength to which the wires can be processed, at least for steel wire called for use under non-axial loads, when the wire will have to be deformed into the final product, such as the assembling into a steel cord, or when the wire in the final product is loaded as such, as in springs, bead wire, hose reinforcement wire, steel tire cord, conveyor belt cord and the like.

In order to minimize the rejection figures, and to be able to exceed the above problem line, we have tried in the sense of adding alloying elements, but the random and unpredictable character of rejections in the bending and torsional ductility tests remained. As a consequence, our attempts to minimize the rejection figures have been limited to conducting the patenting heat treatment operation in a careful way for obtaining the finest and most adequate pearlitic microstructure, and by drawing the wire very carefully, by adapting the speed and reduction per drawing-die in order to minimize microstresses and microcracks which might be the reason of this random behavior in the bending and torsional ductility tests.

SUMMARY OF THE INVENTION

It is an object of the present invention to procure a carbon steel wire of the usual composition given above for high tensile strength applications, processed to a tensile strength above the mentioned line of special care, given by formula (1), showing a better ductility under non-axial loading for a given tensile strength. It is a further object of the present invention to procure such a carbon steel wire, processed to a tensile strength above the problem line, given by formula (2), having sufficient residual bending and torsional ductility in the bending and torsional ductility tests, for use under non-axial loads.

According to the invention, the steel wire is characterized by a sulfur content of less than 0.015%, preferably less than 0.010%.

DETAILED DESCRIPTION OF PREFERRED EMBODIMENTS

We have found indeed, after analysis of the various raw materials and wire processing factors which may influence the tensile strength-ductility relationship, that the reason of the different non-axial ductility behavior of wires that answer the same composition specifications and pass the same high tensile/ductility tests, lies in the fluctuations of the low residual sulfur content.

Up to now, the composition specifications only required a sulfur content not exceeding 0.025% and for drawing wire to a high tensile strength, the mentioned usual compositions herefore in the delivered wire rods for industry had sulfur contents fluctuating somewhere between 0.015% and 0.025% without specifically taking care of the exact composition. The reason is that this residual amount, once it is kept below 0.025%, is of little importance. (But the invention and the explanation hereunder will show that this is only true for axial ductility tests). As a consequence however, the further purification and reduction of the sulfur content was not considered worthwhile, having regard to the sophisticated melting and refining equipment and costly pure raw materials that would be necessary. Instead, the "steel purity" that was optimized related more to the way in which the impurities appeared in the steel: more equal distribution over the volume, finer and more equal distribution of the segregations, etc.

We have found, however, that this residual sulfur content fluctuating between 0.015% and 0.025% strongly influences in a bad sense the non-axial ductility behavior, as explained hereunder, and that consequently, steel compositions must be taken with unusually low sulfor content for this application, i.e. below 0.015%, preferably below 0.010% and most preferably below 0.008%.

The reason why the residual sulfur content is less important with respect to axial tensileductility tests than for non-axial bending/torsion tests is believed to be as follows. During wire drawing, the deformable sulfide inclusions appear to be further elongated too, together with the steel and parallel to the wire axis. In normal axio-symmetric plastic deformation and tensile testing, the fracture occurs at the location of the weakest cross section. But as these cross sections are perpendicular to the direction in which these inclusions have been elongated, these cross sections are about equally strong and the weakening effect of the inclusion is only proportional to the average proportion of inclusion surface to the steel surface in these cross sections, which is negligible. Under non-axial load, however, the fracture planes of which the weakest one must be considered, are not the cross sections, but rather the fracture planes are of more complicated form, and no longer lie perpendicular to the axially elongated inclusions, but more in parallel with them. As a consequence, these fracture planes are not equally strong and the weakest one comprises a much higher proportion of inclusion surface to steel surface than the average proportion, and it is this weakest fracture plane that determines the strength. This deleterious effect is even more pronounced with higher local sulfide contents (such as e.g. in wire drawn from rod material with sulfur segregation), so that consequently, besides an extra-low sulfur content, it is preferable to have this sulfur content well distributed over the steel matrix and that any possible inclusions be finely distributed. We found out that even in low-sulfur rods (0.015% S max.) incidental segregation can be a nuisance factor for high-tensile wire production of elevated torsional ductility. Our investigations revealed that this problem depending on rod source and varying with rod manufacturer, is virtually eliminated when specifying an extra-low sulfur content of max. 0.010%, and most preferably max. 0.008% S.

Besides the advantages in the characteristics in the wire as drawn, the extra-low sulfur content also allows an extra-low freuqency of rupture during the drawing operation into such wire, owing to the better non-axial ductility of the material that is also exploited during the drawing operation. In cases in which the wire is cold rolled into a strip or wire with a rectangular cross section, surface delamination is also less frequent.

The invention is in particular applicable to steel wire of the composition for rubber reinforcement. By the latter is meant a steel wire of the usual composition above for high tensile strength applications, but in which the carbon, manganese and silicon are more specifically present in the ranges going respectively from 0.6 to 1% (preferably 0.7% to 0.9%), from 0.2% to 0.8% and from 0.1% to 0.4%, the amount of phosphorous not exceeding 0.020%. This wire for rubber reinforcement has a diameter ranging from 0.05 mm to 3 mm and, in most cases, is covered by a rubber adherable layer, such as brass or any of the organic compounds known for that purpose. Such wire, when processed to very high tensile strength above the problem-line given by formula (2), has sufficient residual bending and torsional ductility for use in rubber products, i.e. after they have been vulcanized in the rubber, especially in vehicle tires.

The difficulty with usual reinforcement wires in rubber is that vulcanization provokes a heat ageing effect by which the wires undergo an embrittlement with respect to torsional loads. As a consequence, an extra residual ductility must be reserved for this loss which makes the problems more acute in this application. However, with the wires according to the invention, this loss effect appears to be minimized as will be shown hereinafter.

The invention is even more in particular applicable to steel cord for rubber reinforcement. In this cord, the wires have a diameter ranging from 0.05 mm to 0.50 mm and have the above-mentioned composition for rubber reinforcement and are made rubber-adherable by use of a brass coating or another well-known organic or inorganic coating for that use. Such wires, even when drawn to the very high tensile strength above the problem-line, are shown to have sufficient resilient ductility to be stranded into cord without excessive ruptures, especially to have sufficient resilient torsional ductility to be stranded in machines where some or all individual wires receive a permanent twist, and then further to leave sufficient residual ductility, after vulcanization, for further use in the rubber tires. In the case of using the latter stranding machines, the microstructure of the twisted wires shows the elongated grains lying in a helicoidal form along the length of the wire. In the steel composition for such application, some elements such as Pb and Sn are well-known elements to be avoided and are in general limited to a value below 0.001%, 0.001% and 0.004%, respectively, and the total content of scrap elements (i.e. alloying elements such as Cu, Cr and Ni, coming from any possible scrap melt and serving as an indicator of the origin of the steel) are preferably limited to 0.10%.

Such extra-low sulfur pearlitic carbon steel, when used in the diameter range of 0.05 mm to 3 mm and with the composition for rubber reinforcement can be drawn to very high tensile strength, i.e. above the problem-line given by formula (2), but will preferably not be processed to an excessively high tensile strength, so that it will still show the well-known ductile fracture mode in the simple torsion and reverse bend test, and not the well-known brittle and delaminating fracture mode. By the simple torsion test is meant the simple torsion testing of steel wire according to international standard ISO 136, in which a length of wire is twisted round its own axis until it breaks. For diameters going from 1 mm (included) to 3 mm, a length of 100 times the diameter is taken and below 1 mm a length of 200 times the diameter. By the reverse bend test is meant the reverse bend testing of steel wire according to international standard ISO 144, in which a length of wire is repeatedly bent through 90° in opposite directions in one plane, over a cylindrical surface of a specified radius R. This radius R is equal to 1.25 mm, 1.75 mm, 2.5 mm, 3.75 mm, 5 mm or 7.5 mm depending on whether the diameter of the wire is respectively 0.5 mm or lower, ranging from 0.5 mm to 0.7 mm included, from 0.7 to 1 mm included, from 1 mm to 1.5 mm included, from 1.5 mm to 2 mm included and from 2 mm to 3 mm included.

The results of the invention are further illustrated hereinafter by a number of examples. In the results $R_m$ means the tensile strength (stress at rupture) in N/mm, $\delta_t$ means the percentage total elongation, Z means the percentage reduction of area after rupture, $N_b$ means the number of reverse bends in the reverse test with repeated reverse bends through 90° in opposite directions in one plane over a cylindrical surface of radius R, and $N_t$ means the number of turns in the simple torsion test where a length of 100 times the diameter is twisted around its axis until it breaks.

EXAMPLE 1

Steel wire rods of a diameter of 5.5 mm were used of two different compositions A and B. A: 0.43% C; 0.62% Mn; 0.23% Si; 0.018% P; 0.006% S B: 0.45% C; 0.61% Mn; 0.23% Si; 0.014% P; 0.024% S The wire rod properties are summarized in table I, for composition A in the as rolled condition ($A_r$) and in the condition after patenting in the conventional way ($A_p$), and for composition B in the as rolled condition.

TABLE I

| Wire rod | $R_m$ | $\epsilon_t$ | Z | $N_b$ |
|---|---|---|---|---|
| $A_r$ | 785 | 12.8 | 65.7 | 9.5 |
| $A_p$ | 905 | 12.0 | 70.4 | 10.2 |
| $B_r$ | 774 | 11.9 | 58.5 | 7.0 |

R = 10 mm

Direct drawing on a multiple pass machine from wire rod diameter 5.5 mm to final diameter 1.75 mm was carried out for checking the drawability. Rod A performed very well without any wire fractures, whereas in drawing B a few machine stops were noticed due to sudden wire fractures.

The mechanical properties of the drawn wires are given in Table II:

TABLE II

| Wire rod Material | $R_m$ | $\epsilon_t$ | Z | N | $N_b$ |
|---|---|---|---|---|---|
| $A_r$ | 1595 | 2.40 | 55.1 | 15.4 | 40 |
| $A_p$ | 1720 | 2.25 | 58.0 | 16.0 | 39 |
| $B_r$ | 1564 | 2.35 | 50.6 | 9.6 | 35 |

R = 5 mm

Further drawing to lower diameters was no problem for material A, which was drawable to a wire diameter of 1 mm and smaller. For material B, however, drawability became difficult below 1.5 mm due to the increasing number of wire ruptures, and it was impossible to achieve the limit of 1 mm on a conventional production machine. Below 1.4 mm delamination fractures were observed during the simple torsion test.

The mechanical properties of the wire of material A, as obtained on further drawing below 1.75 mm were as follows:

TABLE III
Mechanical properties of wires after further drawing below 1.75 mm

| Wire rod material | Diameter* | $R_m$ | $\epsilon_t$ | Z | $N_b$** | $N_t$ |
|---|---|---|---|---|---|---|
| $A_r$ | 1.35 | 1743 | 2.1 | 53.9 | 12 | 37.5 |
| | 1.12 | 1980 | 1.2 | 49.7 | 12.4 | 36 |
| | 1.00 | 2135 | 1.2 | 50.4 | 10.1 | 34 |
| $A_p$ | 1.35 | 1980 | 1.8 | 55.7 | 15 | 42 |
| | 1.12 | 2251 | 1.0 | 51.2 | 14 | 41 |
| | 1.00 | 2450 | 0.95 | 51.0 | 11.8 | 33 |

*in mm
**R = 5 mm

From the results, it can be concluded that the steel wire of composition A according to the invention reveals a better drawing performance, a higher achievable strength and better ductility properties, even after heavy total reduction in area, as compared to the wire B of conventional composition. Even when in the proximity of the minimum carbon content for wire for high-tensile applications material A showed to be drawable to a tensile strength level above 2100 N/mm$^2$ even without patenting and without delamination fractures, but with a ductile fracture made in bending and torsional testing.

EXAMPLE 2

Steel wires were prepared from three groups of wire rods inside the following composition range: C: 0.80%–0.85% ; Mn: 0.40%–0.70% ; Si: 0.20%–0.30%. The groups differed in their sulfur content:
A: less than 0.010% S
B: from 0.010% to 0.020% S
C: from 0.020% to 0.035% S The wire rods were first drawn to patenting diameter $d_p$ then patented in the conventional way to a fine pearlitic structure with a tensile strength in the range 1350–1400 N/mm$^2$, then coated with a thin brass layer of composition 68% Cu—32% Zn for adhesion to rubber, and finally wet drawn to a final diameter d=0.38 mm. In each group A, B and C, four cases were considered, according to the ratio r=$d_p$/d which is a measure of the degree of cold working and work hardening.

The obtained mechanical properties (average values) are summarized as follows:

TABLE IV

| | A | | | | B | | | | C | | | |
|---|---|---|---|---|---|---|---|---|---|---|---|---|
| r | $R_m$ | Z | $N_b^{(1)}$ | $N_t$ | $R_m$ | Z | $N_b^{(1)}$ | $N_t$ | $R_m$ | Z | $N_b^{(1)}$ | $N_t$ |
| 4 | 2521 | 48.2 | 28.5 | 56 | 2570 | 50.1 | 29 | 45 | 2472 | 50.1 | 28 | 40 |
| 4.5 | 2825 | 45.7 | 26 | 50 | 2845 | 43.7 | 26 | 42 | 2727 | 43.7 | 22 | 41 |
| 5 | 2982 | 42.5 | 25 | 45 | 2943 | 41.6 | 22 | 35 | 2953 | 41.6 | 19 | 32$^{(3)}$ |
| 5.5 | 3168 | 42.4 | 22.5 | 44 | 3090 | 38.7 | 19 | 33$^{(3)}$ | 3070 | 37 | 17.6 | 28$^{(3)}$ |
| 6 | 3355 | 36.5 | 20 | 34$^{(3)}$ | 3247 | 35.9 | 16 | 30$^{(3)}$ | —$^{(2)}$ | —$^{(2)}$ | —$^{(2)}$ | —$^{(2)}$ |

$^{(1)}$R = 1.25 mm
$^{(2)}$brittle ruptures in drawing-die
$^{(3)}$surface delamination The results show that as a general rule the tested ductility parameters decrease with increasing tensile strength, but more rapidly in the steel compositions with more sulfur content. More specifically, the torsional ductility limit is already reached in the vicinity of 3000 N/mm$^2$ for material C, and such material could not be drawn up to the highest diameter reduction r =6.

The wires of group A displayed the smoothest deformation strain hardening behavior and achieved the best compromise between the tested ductility parameters and ultimate strength. Only after the highest total reductions in which the strength reached 3400 N/mm², the attained strength became critical, as reflected in the appearance of surface delaminations in the torsion testing.

From these test data it follows that, all other factors being substantially the same, the close control and limitation of the sulfur content is mandatory in order to have the above residual ductility parameters sufficiently high in wire which is drawn to very high tensile strength.

EXAMPLE 3

Four steel wires were tested of about same composition, but differeing in sulfur content:

|   | % C | % Si | % Mn | % P | % S |
|---|---|---|---|---|---|
| A | 0.85 | 0.26 | 0.56 | 0.018 | 0.024 |
| B | 0.85 | 0.24 | 0.57 | 0.019 | 0.017 |
| C | 0.85 | 0.25 | 0.56 | 0.016 | 0.012 |
| D | 0.84 | 0.23 | 0.62 | 0.015 | 0.008 |

Wire rods of these compositions were drawn in the conventional way into bead wire of diameter 1.05 mm and tensile strength 2300 N/mm². The obtained wires were subsequently artifically aged by heating them up to 150° C. and keeping them at this temperature during 1 hour.

The wires were submitted to the simple torsion test before and after ageing, and the percentage of the wires that do not show a ductile fracture mode was determined. The percentages are given in Table V:

TABLE V

|   | A | B | C | D |
|---|---|---|---|---|
| before ageing | 35 | 7 | 0 | 0 |
| after ageing | 90 | 30 | 8 | 2 |

This shows that the steel wires with extra low sulfur composition can much more easily meet the specifications in the torsion test, even after heat ageing.

Analogous results were obtained with the same compositions, drawn to hose wire of a diameter of 0.40 mm and tensile strength of more than 2500 N/mm², with the difference that, for this small diameter, the wires had in general to be rejected, irrespective of their fracture mode, because no sufficient number of torsions was reached before wire breakage occurred.

The invention can be applied to all sort of tire cord constructions, either in the bead, or in the carcass or in the belt of the tire. The constructions can for instance be 3+9 constructions of round wires of a diameter of 0.15, 0.175, 0.22, 0.25 or 0.28 mm diameter, or 2 +2 constructions, i.e. constructions according to U.S. patent No. 4,408,444 of round wires of a diameter of 0.20, 0.22, 0.25 or 0.28 mm diameter, or single strand constructions 12×1 or 27×1 of round wires of a diameter of 0.15, 0.175, 0.22 and 0.25 mm, all twisted in the same direction with the same pitch, preferably in the so-called compact configuration, i.e., in a cross-sectional figure which is constituted by a number of circles of which the adjacent ones are tangent to each other, when a network of equilateral triangles is formed by connecting the center point of each circle with lines to the center points of the adjacent circles.

Typical compositions for use in these applications comprise compositions according to Table VI:

TABLE VI

| % C | % Mn | % Si |
|---|---|---|
| 0.85 | 0.55 | 0.25 |
| 0.77 | 0.55 | 0.22 |
| 0.68 | 0.75 | 0.17 |
| 0.80 | 0.73 | 0.35 |
| 0.72 | 0.60 | 0.20 |

With respect to alloying elements, other than C, Mn and Si, such as Ni, Cr, Co, Mo and Cu, these are limited to amounts at any rate not more than 3%, and preferably to amounts in which they are to be considered as impurities (i.e. less than 0.05%). As to the elements V, Nb, Ti, Al, Ca, Ce, La, Zr, these are limited to amounts to be considered as impurities, preferably to amounts below 0.005%.

What is claimed is:

1. A method of manufacturing a high strength steel wire having improved resistance to torsional and bending failures, said method comprising the steps of:
    providing a steel consisting essentially of from about 0.4% to about 1.4% by weight carbon, from about 0.1% to about 1.0% by weight manganese, between 0.1% and 0.4% by weight silicon, less than 0.015% by weight sulfur, less than 0.005% by weight aluminum, not more than 3% by weight of any element selected from the group consisting of nickel, chromium, cobalt, molybdenum and copper; and the remainder being iron and incidental impurities;
    drawing said steel into a wire having a patenting diameter;
    patenting said drawn wire to a fine pearlitic structure; and
    drawing said patented wire to a final wire diameter ranging from 0.05 to 0.50 mm and a tensile strength in N/mm² of above 2250–1130 log d, d being the wire diameter in millimeters.

2. A method according to claim 1, further comprising the step of depositing a covering layer of rubber adherable material on the drawn patented wire.

3. A method according to claim 1, wherein said layer of rubber adherable material includes brass.

4. A method according to claim 1, wherein the sulfur content of said steel is less than 0.010% by weight.

5. A method according to claim 4, wherein the sulfur content of said steel is less than 0.008% by weight.

6. A method according to claim 1, wherein said steel contains from about 0.014% to about 0.020% by weight phosphorus.

7. A method according to claim 1, wherein said steel has a carbon content of from about 0.6% to about 1.0% by weight, and a manganese content of from about 0.2 to 0.8% by weight.

8. A method according to claim 7, wherein said steel contains from about 0.7% to about 0.9% by weight carbon.

9. A method according to claim 8, wherein said steel contains from about 0.80% to about 0.85% by weight carbon, from about 0.40% to about 0.70% by weight manganese, and from about 0.17% to about 0.35% by weight silicon.

10. A method according to claim 1, wherein said steel comprises not more than 0.05% by weight of any element selected from the group consisting of nickel, chromium, cobalt, molybdenum and copper.

11. A method according to claim 1, wherein said steel contains less than about 0.10% by weight combined of copper, chromium and nickel.

12. A method according to claim 1, wherein said patented wire is drawn to a tensile strength in Newtons per square millimeter of at least 2325−1130 log d, in which d is the diameter of the wire in millimeters.

13. A method of manufacturing a high strength steel rubber-reinforcing wire having improved resistance to torsional and bending failures, said method comprising the steps of:

providing a steel consisting essentially of from about 0.4% to about 1.4% by weight carbon, from about 0.1% to about 1.0% by weight manganese, between 0.1% and 0.4% by weight silicon, less than 0.015% by weight sulfur, less than 0.005% by weight aluminum, not more than 3% by weight of any element selected from the group consisting of nickel, chromium, cobalt, molybdenum and copper; and the remainder being iron and incidental impurities;

drawing said steel in at least one drawing stage a wire diameter ranging from 0.05 to 3 mm and a tensile strength in N/mm$^2$ of above 2250−1130 log d, d being the wire diameter in millimeters; and depositing a covering layer of rubber adherable material on the wire.

14. A method according to claim 13, wherein said drawing step is carried out in a plurality of drawing stages, and said layer depositing step is carried out between two drawing stages.

15. A method according to claim 13, wherein said layer of rubber adherable material includes brass.

16. A method according to claim 13, wherein the sulfur content of said steel is less than 0.010% by weight.

17. A method according to claim 16, wherein the sulfur content of said steel is less than 0.008% by weight.

18. A method according to claim 13, wherein said steel contains from about 0.014% to about 0.020% by weight phosphorus.

19. A method according to claim 13, wherein said steel has a carbon content of from about 0.6% to about 1.0% by weight, and a manganese content of from 0.2 to 0.8% by weight.

20. A method according to claim 19, wherein said steel contains from about 0.7% to about 0.9% by weight carbon.

21. A method according to claim 20, wherein said steel contains from about 0.80% to about 0.85% by weight carbon, from about 0.40% to about 0.70% by weight manganese, and from about 0.175 to about 0.35% by weight silicon.

22. A method according to claim 13, wherein said steel comprises not more than 0.05% by weight of any element selected from the group consisting of nickel, chromium, cobalt, molybdenum and copper.

23. A method according to claim 13, wherein said steel contains less than about 0.10% by weight combined of copper, chromium and nickel.

24. A method according to claim 13, wherein said steel is drawn to a tensile strength in Newtons per square millimeter of at least 2325−1130 log d, in which d is the diameter of the wire in millimeters.

25. A method of manufacturing a steel cord for rubber reinforcement comprising the steps of:

providing a steel consisting essentially of from about 0.4% to about 1.4% by weight carbon, from about 0.1% to about 1.0% by weight manganese, between 0.1% and 0.4% by weight silicon, less than 0.015% by weight sulfur, less than 0.005% by weight aluminum, not more than 3% by weight of any element selected from the group consisting of nickel, chromium, cobalt, molybdenum and copper; and the remainder being iron and incidental impurities;

drawing said steel into a wire having a patenting diameter;

patenting said drawn wire to a fine pearlitic structure;

drawing said patented wire to a final wire diameter ranging from 0.05 to 0.50 mm and a tensile strength in N/mm$^2$ of above 2250−1130 log d, d being the wire diameter in millimeters; and twisting together a plurality of strands of said drawn patented wire to form a multi-strand steel cord.

26. A method according to claim 25, further comprising the step of depositing a covering layer of rubber adherable material on the patented wire prior to said twisting step.

27. A method according to claim 26, wherein said layer depositing step is carried out prior to drawing the patented wire to final diameter.

28. A method according to claim 26, wherein said layer of rubber adherable material includes brass.

29. A method according to claim 25, wherein the sulfur content of said steel is less than 0.010% by weight.

30. A method according to claim 29, wherein the sulfur content of said steel is less than 0.008% by weight.

31. A method according to claim 25, wherein said steel contains less than about 0.10% by weight combined of copper, chromium and nickel.

32. A method according to claim 25, wherein said patented wire is drawn to a tensile strength in Newtons per square millimeter of at least 2325−1130 log d, in which d is the diameter of the wire in millimeters.

* * * * *